(12) United States Patent
De Baere

(10) Patent No.: US 11,632,911 B2
(45) Date of Patent: Apr. 25, 2023

(54) AGRICULTURAL BALER WITH KNIFE OVERLOAD MITIGATING SYSTEM

(71) Applicant: CNH Industrial America LLC, New Holland, PA (US)

(72) Inventor: Freek De Baere, Maldegem (BE)

(73) Assignee: CNH Industrial America LLC, New Holland, PA (US)

( * ) Notice: Subject to any disclaimer, the term of this patent is extended or adjusted under 35 U.S.C. 154(b) by 568 days.

(21) Appl. No.: 16/791,309

(22) Filed: Feb. 14, 2020

(65) Prior Publication Data

US 2021/0251149 A1 Aug. 19, 2021

(51) Int. Cl.
| | | |
|---|---|---|
| A01F 15/10 | (2006.01) | |
| A01D 75/18 | (2006.01) | |
| A01F 29/09 | (2010.01) | |
| A01D 90/04 | (2006.01) | |

(52) U.S. Cl.
CPC ............ *A01F 15/10* (2013.01); *A01D 75/182* (2013.01); *A01D 90/04* (2013.01); *A01F 29/095* (2013.01); *A01F 2015/107* (2013.01)

(58) Field of Classification Search
CPC .. A01F 15/10; A01F 29/095; A01F 2015/107; A01F 29/16; A01F 29/10; A01D 75/182; A01D 90/04
See application file for complete search history.

(56) References Cited

U.S. PATENT DOCUMENTS

| | | | |
|---|---|---|---|
| 3,934,393 A | 1/1976 | Campbell et al. | |
| 4,955,188 A * | 9/1990 | von Allworden | ...... A01D 90/04 100/6 |
| 5,974,776 A | 11/1999 | Prellwitz | |
| 6,370,851 B1 | 4/2002 | Uros et al. | |
| 6,594,983 B1 * | 7/2003 | Krone | ..................... A01D 90/04 56/341 |
| 6,912,835 B1 | 7/2005 | Chabassier | |

(Continued)

FOREIGN PATENT DOCUMENTS

| | | | | |
|---|---|---|---|---|
| CH | 664669 A5 * | 3/1988 | ............. | A01D 90/04 |
| CH | 675342 A5 * | 9/1990 | ............. | A01D 90/04 |

(Continued)

OTHER PUBLICATIONS

Extended European Search Report for EP Application No. 21156515.5 dated Jul. 8, 2021 (six pages).

*Primary Examiner* — Arpad F Kovacs
(74) *Attorney, Agent, or Firm* — Patrick Sheldrake

(57) ABSTRACT

A cutting unit includes: a plurality of knives; a knife guard with at least one opening; a knife tray carrying the knives and movable between an exposed position where the knives extend through the at least one opening and a retracted position where the knives are shielded by the knife guard; and an overload protection assembly including a first slide member coupled to the knife tray and having a first engagement surface and a second slide member having a second engagement surface that is engaged with the first engagement surface. The first slide member and the second slide member are held together and slidable relative to one another such that the first slide member slides relative to the second slide member to move the knife tray from the exposed position to the retracted position when an overload force is applied to at least one of the knives.

20 Claims, 4 Drawing Sheets

(56) References Cited

U.S. PATENT DOCUMENTS

| | | |
|---|---|---|
| 7,252,587 B2 | 8/2007 | Viaud |
| 7,404,284 B2 | 7/2008 | Viaud et al. |
| 7,584,594 B2 * | 9/2009 | Viaud .................. A01F 15/106 56/364 |
| 8,920,227 B2 | 12/2014 | Murray et al. |
| 9,137,949 B2 | 9/2015 | Issac et al. |
| 9,723,793 B2 | 8/2017 | Meiners |
| 10,045,489 B2 | 8/2018 | Posselius et al. |
| 2008/0028737 A1 * | 2/2008 | Viaud .................. A01F 15/106 56/341 |
| 2009/0272089 A1 * | 11/2009 | Lucot .................... A01D 90/04 56/131 |
| 2013/0167498 A1 * | 7/2013 | Haycocks ............... A01F 15/08 56/341 |
| 2014/0096692 A1 | 4/2014 | Baldauf |
| 2014/0179383 A1 * | 6/2014 | Isaac ...................... A01F 12/40 460/112 |
| 2014/0187298 A1 * | 7/2014 | Murray ................ A01D 75/182 460/112 |
| 2016/0219789 A1 * | 8/2016 | Derscheid ............... A01F 15/10 |
| 2017/0099771 A1 * | 4/2017 | Linde .................... A01F 12/40 |
| 2018/0027742 A1 | 2/2018 | Schinstock |
| 2020/0093068 A1 * | 3/2020 | Claeys .................... A01F 15/10 |
| 2021/0267131 A1 * | 9/2021 | Giuliani ................. A01F 29/08 |

FOREIGN PATENT DOCUMENTS

| | | | | |
|---|---|---|---|---|
| DE | 3625512 A1 * | 2/1988 | ............ | A01D 90/04 |
| DE | 3617003 C2 * | 4/1989 | ............ | A01D 90/04 |
| DE | 4012533 A1 * | 10/1991 | ............ | A01D 90/04 |
| DE | 4035334 A1 * | 10/1991 | ............ | A01D 90/04 |
| DE | 4139499 A1 * | 6/1993 | ............ | A01D 90/04 |
| DE | 4211518 A1 * | 10/1993 | ............ | A01D 90/04 |
| DE | 4302199 A1 * | 7/1994 | ............ | A01D 90/04 |
| DE | 19517639 A1 * | 11/1996 | ............ | A01D 90/04 |
| DE | 19617033 A1 * | 11/1997 | ............ | A01D 90/04 |
| DE | 19707662 A1 * | 8/1998 | ............ | A01D 90/04 |
| DE | 19717542 A1 | 10/1998 | | |
| DE | 19805854 C1 * | 5/1999 | ............ | A01D 90/04 |
| DE | 19841598 A1 * | 3/2000 | ............ | A01D 90/04 |
| DE | 102005054429 A1 * | 6/2007 | ............ | A01D 90/04 |
| DE | 102012007895 A1 * | 10/2013 | ............ | A01D 90/04 |
| DE | 202014006083 U1 * | 12/2015 | ............ | A01D 90/04 |
| DE | 202015003357 U1 * | 9/2016 | ............ | A01D 90/04 |
| DE | 202017100339 U1 * | 3/2017 | ............ | A01D 90/04 |
| DE | 102016104697 A1 * | 9/2017 | ............ | A01D 90/04 |
| DE | 202017104191 U1 * | 9/2017 | ............ | A01D 75/182 |
| EP | 0205854 A1 | 12/1986 | | |
| EP | 0341508 A1 | 11/1989 | | |
| EP | 0689760 A1 * | 1/1996 | ............ | A01D 90/04 |
| EP | 0746971 B1 * | 12/1999 | ............ | A01D 90/04 |
| EP | 1027821 A2 * | 8/2000 | ............ | A01D 90/04 |
| EP | 1062860 A2 * | 12/2000 | ............ | A01F 15/10 |
| EP | 1389415 A1 * | 2/2004 | ............ | A01D 75/182 |
| EP | 1574124 A1 * | 9/2005 | ............ | A01D 90/04 |
| EP | 1584226 A2 * | 10/2005 | ............ | A01D 90/04 |
| EP | 2910105 A1 * | 8/2015 | ............ | A01D 90/04 |
| EP | 2910106 A1 * | 8/2015 | ............ | A01D 90/04 |
| EP | 3050426 A1 * | 8/2016 | ............ | A01D 90/04 |
| EP | 3053429 B1 * | 12/2017 | ............ | A01D 90/04 |
| EP | 3275303 A1 * | 1/2018 | ............ | A01D 90/04 |
| EP | 3847886 A1 * | 7/2021 | ............ | A01D 90/04 |
| GB | 2055557 A * | 3/1981 | ............ | A01D 90/04 |
| GB | 2095638 A * | 10/1982 | ............ | A01D 90/04 |
| JP | H09275755 A * | 10/1997 | ............ | A01F 15/10 |
| WO | WO-2020240428 A1 * | 12/2020 | ............ | A01F 25/20 |

* cited by examiner

AGRICULTURAL BALER WITH KNIFE OVERLOAD MITIGATING SYSTEM

BACKGROUND OF THE INVENTION

The present invention pertains to agricultural balers and, more specifically, to agricultural balers with knives for cutting crop material.

Agricultural harvesting machines, such as balers, are used to consolidate and package crop material so as to facilitate the storage and handling of the crop material for later use. In the case of hay, a mower-conditioner is typically used to cut and condition the crop material for windrow drying in the sun. In the case of straw, an agricultural combine discharges non-grain crop material from the rear of the combine defining the straw (such as wheat or oat straw) which is to be picked up by the baler. The cut crop material is typically raked and dried, and a baler, such as a large square baler or round baler, straddles the windrows and travels along the windrows to pick up the crop material and form it into bales.

A round baler may generally include a frame, supported by wheels, a pickup unit to engage and lift the crop material into the baler, a cutting unit, a main bale chamber for forming a bale, and a wrapping mechanism for wrapping or tying a material around the bale after it has been formed in the main bale chamber. As the baler is towed over a windrow, the pickup unit lifts the crop material into the baler. Then, the crop material may be cut into smaller pieces by the cutting unit. As the crop material enters the main bale chamber, multiple carrier elements, e.g. rollers, chains and slats, and/or belts, will begin to roll a bale of hay within the chamber. These carrier elements are movable so that the chamber can initially contract and subsequently expand to maintain an appropriate amount of pressure on the periphery of the bale. After the bale is formed and wrapped by the wrapping mechanism, the rear of the baler is configured to open for allowing the bale to be discharged onto the field.

The cutting unit includes knives that cut crop material fed toward the knives by a rotor or other conveyance device. As crop material is fed toward the knives, the knives cut the crop material into smaller pieces. In some instances, the load on the knives from the crop material can cause damage to the cutting unit.

What is needed in the art is a way to protect the cutting unit from damage during operation.

SUMMARY OF THE INVENTION

Exemplary embodiments provided according to the present disclosure include an overload protection assembly with slide members that slide relative to one another to retract a knife tray when an overload force is applied to one or more knives carried by the knife tray.

In some exemplary embodiments provided in accordance with the present disclosure, a cutting unit for an agricultural baler, includes: a plurality of knives; a knife guard with at least one opening; a knife tray carrying the knives, the knife tray being movable between an exposed position where the knives extend through the at least one opening and a retracted position where the knives are shielded by the knife guard; and an overload protection assembly including a first slide member coupled to the knife tray and having a first engagement surface and a second slide member having a second engagement surface that is engaged with the first engagement surface. The first slide member and the second slide member are held together and slidable relative to one another such that the first slide member slides relative to the second slide member to move the knife tray from the exposed position to the retracted position when an overload force is applied to at least one of the knives.

In some exemplary embodiments provided in accordance with the present disclosure, an agricultural baler includes: a chassis; a pickup carried by the chassis and carrying a plurality of tines, the pickup being configured to rotate the tines and pickup crop material; and a cutting unit carried by the chassis. The cutting unit includes: a plurality of knives; a knife guard with at least one opening; a knife tray carrying the knives, the knife tray being movable between an exposed position where the knives extend through the at least one opening and a retracted position where the knives are shielded by the knife guard, the knives being configured to cut crop material picked up by the pickup when extending through the at least one opening; and an overload protection assembly including a first slide member coupled to the knife tray and having a first engagement surface and a second slide member including a second engagement surface that is engaged with the first engagement surface. The first slide member and the second slide member are held together and slidable relative to one another such that the first slide member slides relative to the second slide member to move the knife tray from the exposed position to the retracted position when an overload force is applied to at least one of the knives.

One possible advantage that may be realized by exemplary embodiments provided according to the present disclosure is that the knives can be retracted when the overload force, which may originate from a blockage, is applied to one of the knives to protect the cutting unit from being damaged.

Another possible advantage that may be realized by exemplary embodiments provided according to the present disclosure is that the overload protection assembly is an elegant solution that can be easily manufactured and installed.

BRIEF DESCRIPTION OF THE DRAWINGS

For the purpose of illustration, there are shown in the drawings certain embodiments of the present invention. It should be understood, however, that the invention is not limited to the precise arrangements, dimensions, and instruments shown. Like numerals indicate like elements throughout the drawings. In the drawings.

DETAILED DESCRIPTION OF THE INVENTION

The terms "forward", "rearward", "left" and "right", when used in connection with the agricultural baler and/or components thereof are usually determined with reference to the direction of forward operative travel of the towing vehicle, but they should not be construed as limiting. The terms "longitudinal" and "transverse" are determined with reference to the fore-and-aft direction of the towing vehicle and are equally not to be construed as limiting.

Figure 1:
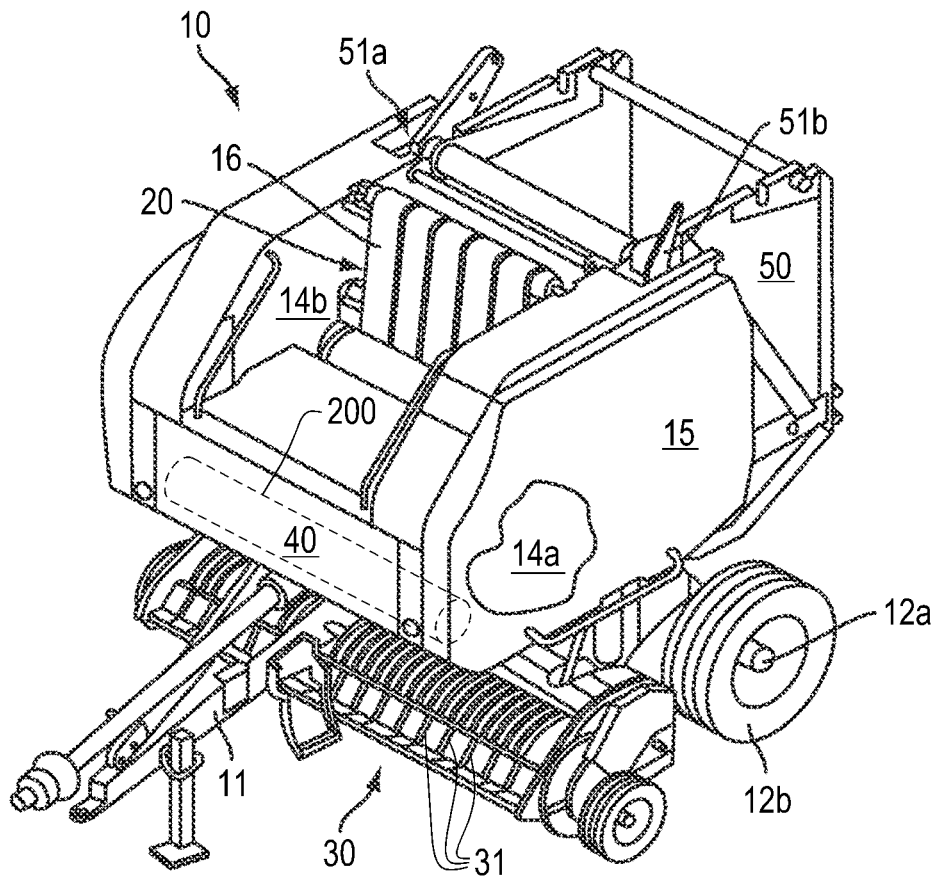
FIG. 1 illustrates a perspective view of an exemplary embodiment of an agricultural baler including a cutting unit, provided in accordance with the present disclosure.

Referring now to the drawings, and more particularly to FIG. 1, an exemplary embodiment of a round baler 10 is shown to include a chassis terminating forwardly in a tongue 11 and rearward slightly beyond a transverse axle 12a to which a pair of wheels 12b (only one shown) is mounted, thus forming a wheel supported chassis. The chassis supports a series of belts 16 and floor rolls, which together with a first sidewall 14a (shown in the breakout) behind and generally parallel to cover panel 15 and a second sidewall 14b, collectively forming a bale-forming chamber 20. Cut crop material is picked up by a plurality of tines 31 of a transverse pickup 30 and fed through a harvesting assembly into the bale-forming chamber 20 where it is formed into a cylindrically shaped bale by a series of conveyor belts 16. The bale is then optionally wrapped with twine or a net wrapping material dispensed from a wrapping mechanism generally behind shield 40. Upon completion of the optional wrapping process, the tailgate 50 pivots upwardly about pivot points 51a, 51b and the bale is discharged onto the ground. It should be appreciated that while the baler 10 is illustrated and described as a round baler, in some embodiments the baler 10 is configured as a square baler.

Figure 2:
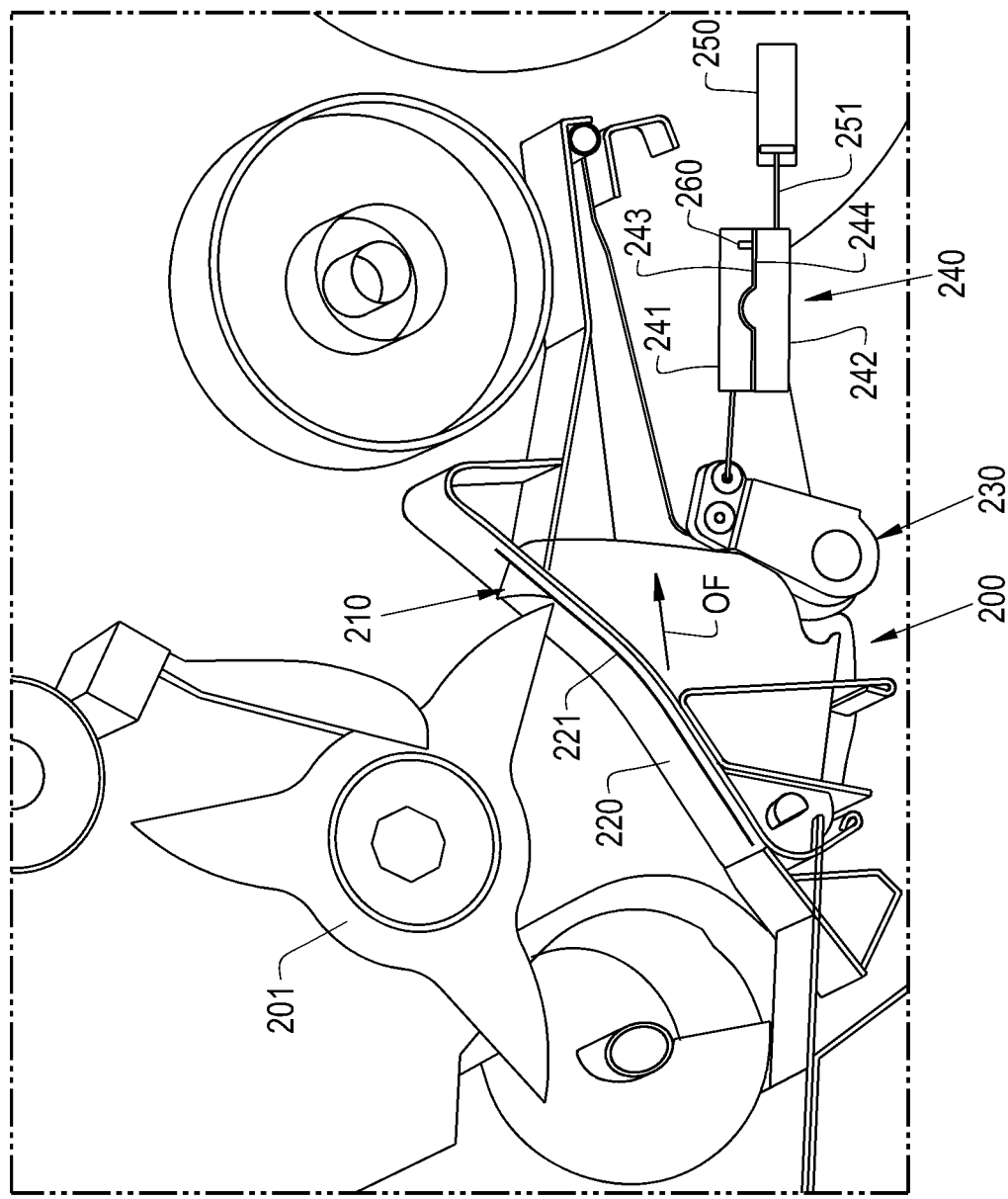
FIG. 2 illustrates a sectional view of the agricultural baler of FIG. 1 with a knife tray of the cutting unit in an exposed position.

Referring still to FIG. 1, and referring now to FIG. 2 as well, a cutting unit 200 is carried by the chassis and includes a plurality of knives 210, a knife guard 220 with one or more openings 221, and a knife tray 230 that carries the knives 210. As illustrated in FIG. 2, the knife tray 230 may assume an exposed position where the knives 210 extend through the opening(s) 221 of the knife guard 220. When the knives 210 extend through the opening(s) 221, the knives 210 may cut crop material that is picked up and fed rearwardly by the pickup 30. In some embodiments, the cutting unit 200 includes a rotor 201 that rotates to force the collected crop material against the knives 210 to cut the crop material into smaller pieces.

During operation, the knives 210 come into contact with conveyed crop material to cut the crop material into smaller pieces. In certain instances, such as during a blockage, the load exerted on the knives 210 by the moving crop material is excessively high. If the knives 210 are held stationary during such loading, damage to the cutting unit 200 may result. Further, the knives 210 can make it more difficult to clear the blockage by reducing clearance for the blockage to pass. Known solutions, such as providing each knife with a spring-loaded protection mechanism, have been effective to reduce the load experienced by the knives but are complicated and difficult to manufacture.

Figure 3:
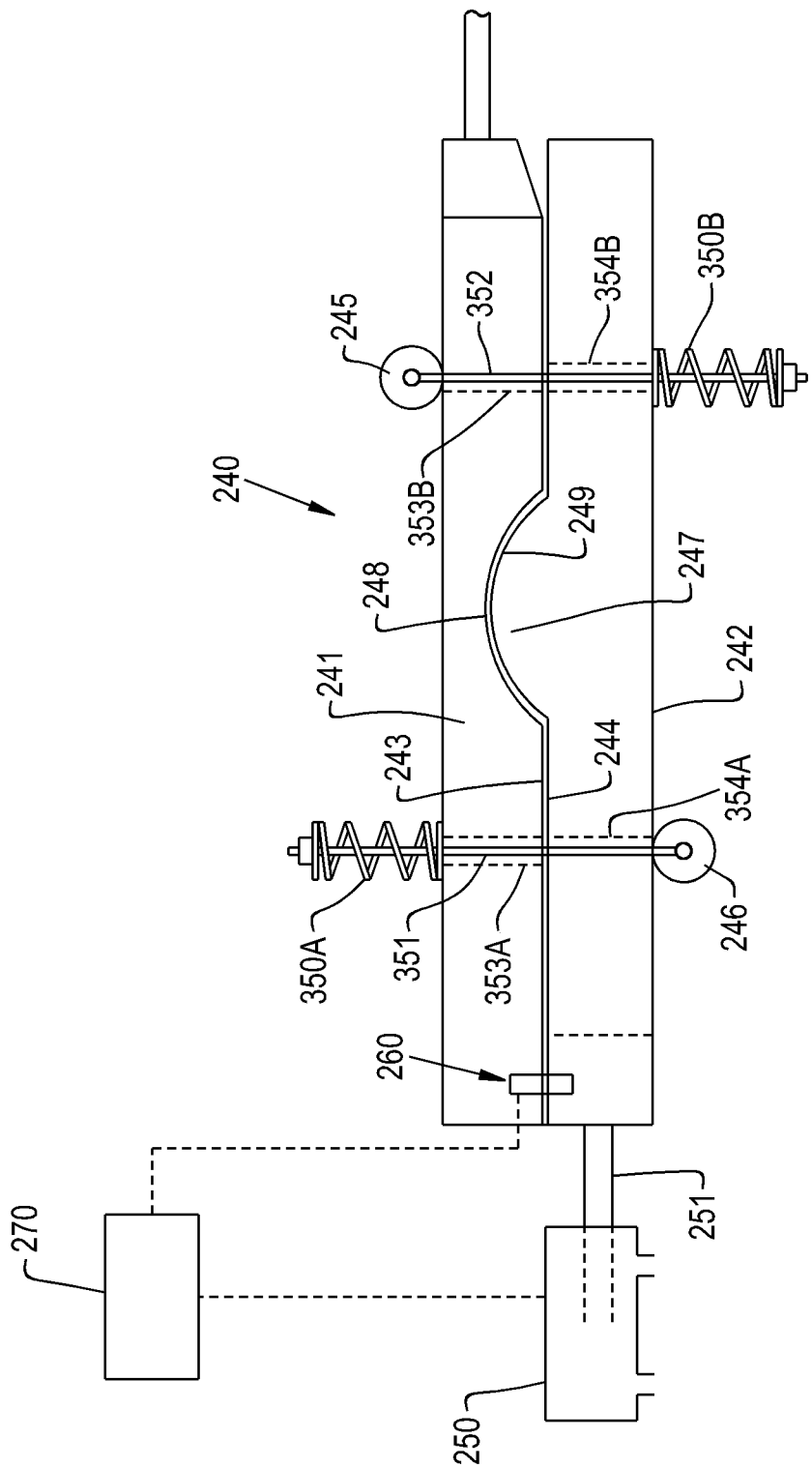
FIG. 3 illustrates a side view of an exemplary embodiment of an overload protection assembly of the cutting unit illustrated in FIGS. 1-2, provided in accordance with the present disclosure.
Figure 4:
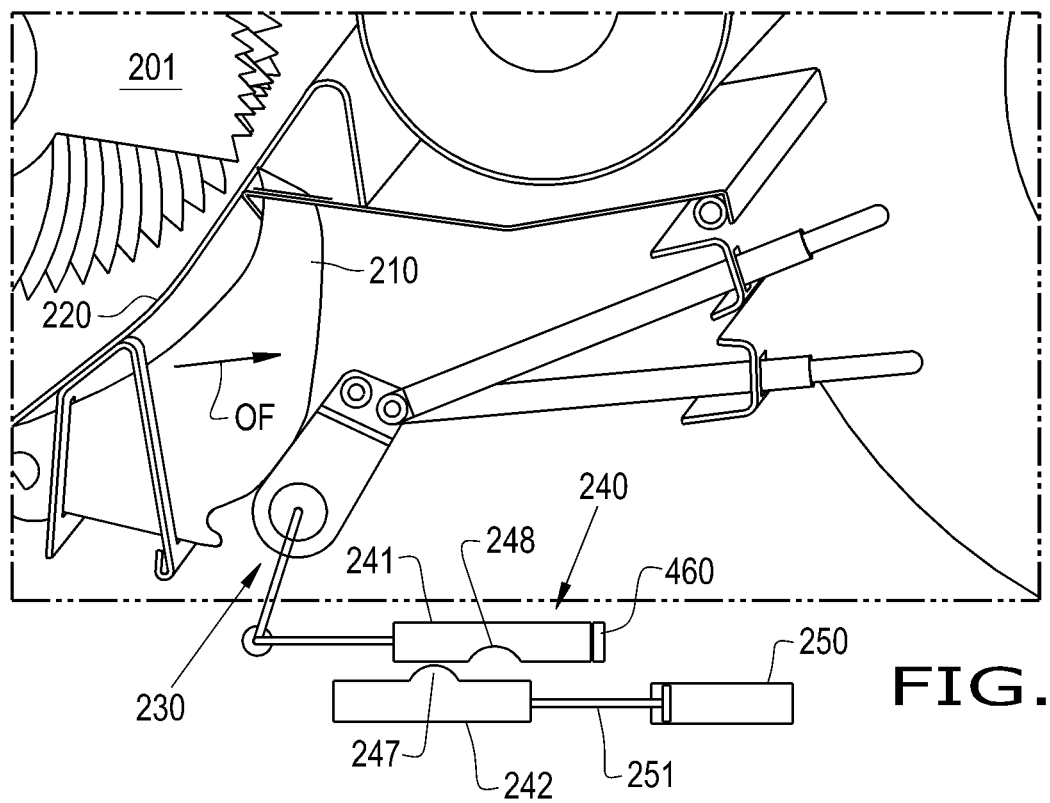
FIG. 4 illustrates a sectional view of the agricultural baler of FIGS. 1-2 when a knife tray carrying the knives has moved to a retracted position.

To overcome some of the previously described issues with known cutting units, and referring now to FIGS. 3 and 4 as well, the cutting unit 200 provided according to the present disclosure includes an overload protection assembly 240 with a first slide member 241 coupled to the knife tray 230 and a second slide member 242. The first slide member 241 has a first engagement surface 243 and the second slide member 242 has a second engagement surface 244 that is engaged with the first engagement surface 243. The slide members 241, 242 are held together and slidable relative to one another such that the first slide member 241 slides relative to the second slide member 242 to move the knife tray 230 from the exposed position (illustrated in FIG. 2) to a retracted position (illustrated in FIG. 4) when an overload force, designated by arrow OF, is applied to at least one of the knives 210. The overload force OF may originate from a blockage of crop material that is forced against the knives 210 by the rotor 201. When the knife tray 230 is in the retracted position, the knives 210 are shielded by the knife guard 220 by, for example, being housed within the knife guard 220 and not extending out of the opening(s) 221. Each of the slide members 241, 242 may contact a respective roller 245, 246 that can slide along a track or other surface to allow the slide members 241, 242 to slide relative to one another.

Resistance to the sliding may be provided by frictional forces between the engagement surfaces 243, 244 engaging one another. It should thus be appreciated that tuning of the overload force that is required to slide the first slide member 241 to move the knife tray 230 to the retracted position may be accomplished by, for example, adjusting the frictional forces between the engagement surfaces 243, 244 of the slide members 241, 242. In some embodiments, one or more springs, illustrated as a first spring 350A and a second spring 350B, bear on the first slide member 241 and/or the second slide member 242 to hold the slide members 241, 242 together. The spring force of each spring 350A, 350B can be adjusted to tune the frictional force between the engagement surfaces 243, 244 by adjusting the force holding the slide members 241, 242 together. Each of the springs 350A, 350B may be disposed about a respective spring rod 351, 352. Each of the spring rods 351, 352 may extend through respective rod openings 353A, 353B, 354A, 354B formed in the slide members 241, 242. In some embodiments, the rollers 245, 246, which may be in the form of roller bearings, that bear on the slide members 241, 242 are coupled to the spring rods 351, 352.

In some embodiments, one of the slide members 241, 242, illustrated as the second slide member 242, has a locking projection 247 on its engagement surface 244 and the other of the slide members 241, 242, illustrated as the first slide member 241, has a recess 248 holding to least a portion of the locking projection 247 and which may be formed in the first engagement surface 243. While the locking projection 247 is illustrated and described as extending from the second engagement surface 244 of the second slide member 242 and the recess 248 is illustrated and described as being formed in the first engagement surface 243 of the first slide member 241, the locking projection 247 can be formed on the first slide member 241 and the recess 248 can be formed in the second slide member 242 to achieve a similar effect, in accordance with the present disclosure. The locking projection 247 and the recess 248 may be formed in the slide members 241, 242 by casting the slide members 241, 242 or using any other suitable manufacturing technique.

In some embodiments, the entirety of the locking projection 247 is held within the recess 248 when the knife tray 230 is in the exposed position, i.e., when the locking projection 247 and the recess 248 are in full engagement. When the knife tray 230 moves from the exposed position to the retracted position, as illustrated in FIG. 4, the locking projection 247 and the recess 248 may come out of full engagement as the first slide member 241 slides relative to the second slide member 242. The overload force OF may be tuned by adjusting the relative shapes of the locking projection 247 and the recess 248. As illustrated in FIG. 3, the locking projection 247 may include a curved surface 249 and the recess 248 may have a curved shape that corresponds to the curved surface 249, allowing the recess 248, and thus the first slide member 241, to slide relative to the locking projection 247 and the second slide member 242 when the overload force OF is applied to one or more of the knives 210. It should thus be appreciated that the overload force OF that slides the first slide member 241 relative to the second slide member 242 to move the knife tray 230 to the retracted position may be tuned by adjusting the relative shapes of the locking projection 247 and the recess 248.

Figure 5:
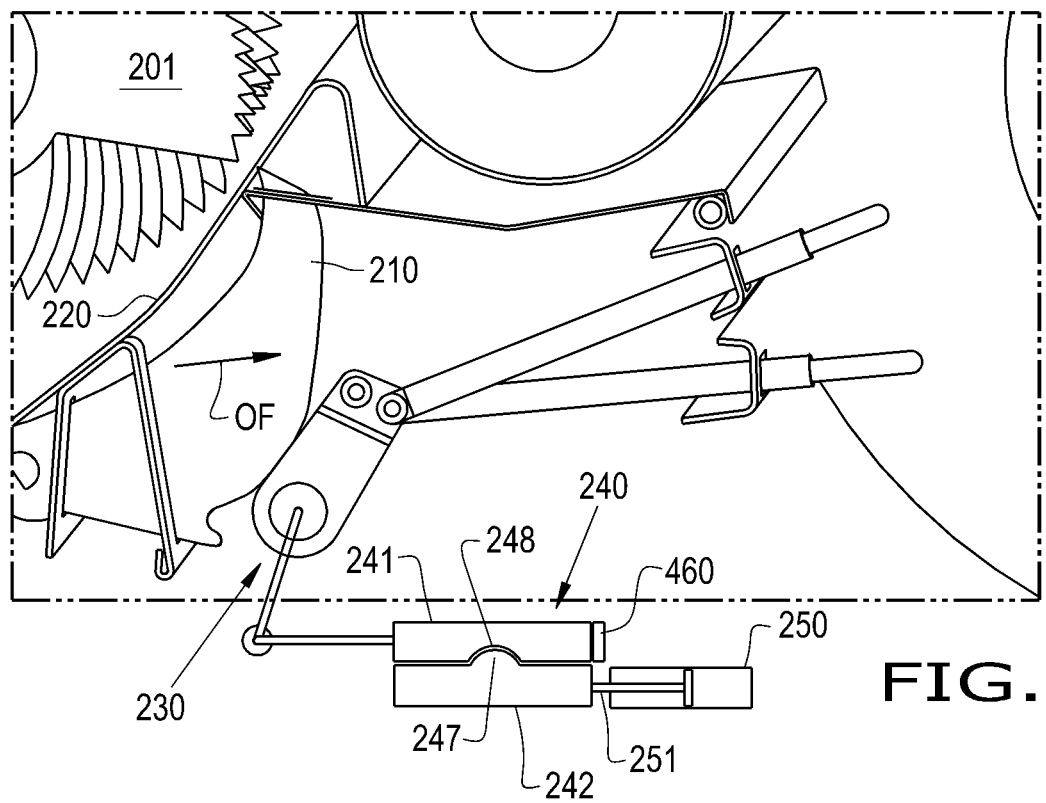
FIG. 5 illustrates a sectional view of the agricultural baler of FIGS. 1-2 and 4 when an actuator has moved a slide member of the overload protection assembly of FIG. 3 to re-engage another slide member.

In some embodiments, and referring now to FIG. 5 as well, the cutting unit 200 includes an actuator 250 that is coupled to the second slide member 242 and configured to slide the second slide member 242 relative to the first slide member 241. The actuator 250 sliding the second slide member 242 relative to the first slide member 241 when the locking projection 247 and the recess 248 are out of full, or any, engagement can re-engage the locking projection 247 and the recess 248. When the locking projection 247 and the recess 248 are re-engaged, the actuator 250 can move the slide members 241, 242 to return the knife tray 230 to the exposed position from the shielded position. It should be appreciated that the actuator 250 can also move the slide members 241, 242 when they are engaged to move the knife tray 230 from the exposed position to the shielded position, and vice versa. In other words, extension and retraction of the actuator 250 can both control movement of the knife tray 230 when the locking projection 247 and the recess 248 are engaged and also slide the second slide member 242 relative to the first slide member 241 to re-engage the locking projection 247 and the recess 248 when they are out of full and/or partial engagement.

Referring specifically to FIG. 4, it is illustrated that the first slide member 241 has slid rearwardly relative to the second slide member 242 so the recess 248 and the locking projection 247 are not fully engaged and the knife tray 230 is in the shielded position so the knives 210 are not exposed through the opening(s) 221 of the knife guard 220. The actuator 250 may be activated to retract an actuator rod 251 that is coupled to the second slide member 242 so the second slide member 242 also slides rearwardly, relative to the first slide member 241, until the locking projection 247 of the second slide member 242 re-engages the recess 248 of the first slide member 241. When the locking projection 247 and the recess 248 are re-engaged, as illustrated in FIG. 5, the actuator 250 may be activated to extend the actuator rod 251 so the slide members 241, 242 slide forwardly to move the knife tray 230 to the exposed position and extend the knives 210 through the opening(s) 221 of the knife guard 220. To make it easier to re-engage the locking projection 247 and the recess 248, a stop 460 may be provided that limits sliding of the first slide member 241 relative to the second slide member 242.

In some embodiments, and referring specifically to FIG. 3, the cutting unit 200 includes a proximity sensor 260 that is configured to output a retracted signal when the knife tray 230 moves to the retracted position. In some embodiments, the proximity sensor 260 is carried by one of the slide members 241, 242 and is configured to output the retracted signal when the proximity sensor 260 senses that the slide members 241, 242 have slid relative to each other. Relative sliding between the slide members 241, 242 during operation tends to correspond to movement of the first slide member 241 relative to the second slide member 242 and an accompanying movement of the knife tray 230 to the retracted position.

A controller 270 may be operatively coupled to the proximity sensor 260 and the actuator 250. The controller 270 may be configured to receive the retracted signal that is output by the proximity sensor 260 and output a re-engagement signal to the actuator 250 to cause the actuator 250 to slide the second slide member 242 to re-engage the locking projection 247 and the recess 248, as previously described. The controller 270 may be configured to also output a return signal to the actuator 250 to cause the actuator 250 to slide the second slide member 242 and the first slide member 241 and return the knife tray 230 to the exposed position. The controller 270 may be configured to output the return signal, for example, after outputting the re-engagement signal to cause re-engagement of the locking projection 247 and the recess 248.

In some embodiments, the controller 270 is further configured to output a retracted warning signal to a display responsively to receiving the retracted signal. The display may be, for example, disposed in an operator cab of a towing vehicle that is towing the baler 10 and configured to display a warning that the knife tray 230 has retracted in response to receiving the retracted warning signal. The controller 270 may be configured to receive a re-engage and return signal, from the display or elsewhere, after outputting the retracted warning signal and responsively output the re-engagement signal and the return signal. Thus, it should be appreciated that the controller 270 can alert an operator that the knife tray 230, and carried knives 210, has moved to the shielded position and allow an operator to signal for the actuator 250 to return the knife tray 230 to the exposed position.

From the foregoing, it should be appreciated that the overload protection assembly 240 provided according to the present disclosure can prevent excessive loads from being transmitted to the cutting unit 200 by retracting the knives 210. Retracting the knives 210 can also make it easier to clear a blockage by increasing the amount of clearance that is available to allow passage of the blockage. The slide members 241, 242 can be adjusted in a variety of ways to tailor the overload force that causes the first slide member 241 to slide relative to the second slide member 242 so the knife tray 230 moves to the shielded position where the knives 210 are not exposed to collected crop material. Further, the slide members 241, 242 can be easily assembled together as castings and controlled by, for example, extension and retraction of the actuator 250 to move the knife tray 230 and the knives 210 back to the exposed position from the retracted position. Thus, the overload protection assembly 240 provides an elegant solution for reducing the risk of the cutting unit 200 being damaged while also being easily manufactured and assembled and convenient for returning the knife tray 230 to the exposed position.

These and other advantages of the present invention will be apparent to those skilled in the art from the foregoing specification. Accordingly, it is to be recognized by those skilled in the art that changes or modifications may be made to the above-described embodiments without departing from the broad inventive concepts of the invention. It is to be understood that this invention is not limited to the particular embodiments described herein, but is intended to include all changes and modifications that are within the scope and spirit of the invention.

The invention claimed is:

1. A cutting unit for an agricultural baler, comprising:
a plurality of knives;
a knife guard comprising at least one opening;
a knife tray carrying the knives, the knife tray being movable between an exposed position where the knives extend through the at least one opening and a retracted position where the knives are shielded by the knife guard; and
an overload protection assembly comprising a first slide member coupled to the knife tray and comprising a first engagement surface and a second slide member comprising a second engagement surface that is engaged with the first engagement surface, the first slide member and the second slide member being held together and linearly slidable relative to one another such that the first slide member slides relative to the second slide member to move the knife tray from the exposed position to the retracted position when an overload force is applied to at least one of the knives.

2. The cutting unit of claim 1, wherein the first slide member or the second slide member comprises a locking projection on its engagement surface and the other of the first slide member and the second slide member comprises a recess holding at least a portion of the locking projection.

3. The cutting unit of claim 2, wherein the locking projection and the recess are configured to come out of full engagement when the knife tray moves from the exposed position to the retracted position.

4. The cutting unit of claim 3, further comprising an actuator coupled to the second slide member and configured to slide the second slide member relative to the first slide member to re-engage the locking projection and the recess and move the second slide member and the first slide member to return the knife tray to the exposed position when the locking projection and the recess are re-engaged.

5. The cutting unit of claim 4, further comprising a proximity sensor configured to output a retracted signal when the knife tray moves to the retracted position.

6. The cutting unit of claim 5, further comprising a controller operably coupled to the proximity sensor and the actuator, the controller being configured to:
receive the retracted signal; and
output a re-engagement signal to the actuator to cause the actuator to slide the second slide member to re-engage the locking projection and the recess; and
output a return signal to the actuator to cause the actuator to slide the second slide member and the first slide member and return the knife tray to the exposed position.

7. The cutting unit of claim 3, wherein the locking projection comprises a curved surface and the recess has a curved shape corresponding to the curved surface.

8. The cutting unit of claim 7, wherein the recess is formed in the first engagement surface of the first slide member and the locking projection extends from the second engagement surface of the second slide member.

9. The cutting unit of claim 1, further comprising at least one spring bearing on at least one of the first slide member and the second slide member to hold the first slide member and the second slide member together.

10. The cutting unit of claim 9, wherein the at least one spring comprises a first spring bearing on the first slide member and a second spring bearing on the second slide member.

11. An agricultural baler, comprising:
a chassis;
a pickup carried by the chassis and carrying a plurality of tines, the pickup being configured to rotate the tines and pickup crop material; and
a cutting unit carried by the chassis, the cutting unit comprising:
a plurality of knives;
a knife guard comprising at least one opening;
a knife tray carrying the knives, the knife tray being movable between an exposed position where the knives extend through the at least one opening and a retracted position where the knives are shielded by the knife guard, the knives being configured to cut crop material picked up by the pickup when extending through the at least one opening; and
an overload protection assembly comprising a first slide member coupled to the knife tray and comprising a first engagement surface and a second slide member comprising a second engagement surface that is engaged with the first engagement surface, the first slide member and the second slide member being held together and linearly slidable relative to one another such that the first slide member slides relative to the second slide member to move the knife tray from the exposed position to the retracted position when an overload force is applied to at least one of the knives.

12. The baler of claim 11, wherein the first slide member or the second slide member comprises a locking projection on its engagement surface and the other of the first slide member and the second slide member comprises a recess holding at least a portion of the locking projection.

13. The baler of claim 12, wherein the locking projection and the recess are configured to come out of full engagement when the knife tray moves from the exposed position to the retracted position.

14. The baler of claim 13, further comprising an actuator coupled to the second slide member and configured to slide the second slide member relative to the first slide member to re-engage the locking projection and the recess and move the second slide member and the first slide member to return the knife tray to the exposed position when the locking projection and the recess are re-engaged.

15. The baler of claim 14, further comprising a proximity sensor configured to output a retracted signal when the knife tray moves to the retracted position and a controller operably coupled to the proximity sensor and the actuator, the controller being configured to:
receive the retracted signal;
output a re-engagement signal to the actuator to cause the actuator to slide the second slide member to re-engage the locking projection and the recess; and
output a return signal to the actuator so the actuator to cause the actuator to slide the second slide member and the first slide member and return the knife tray to the exposed position.

16. The baler of claim 15, wherein the controller is further configured to output a retracted warning signal to a display responsively to receiving the retracted signal.

17. The baler of claim 13, wherein the locking projection comprises a curved surface and the recess has a curved shape corresponding to the curved surface.

18. The baler of claim 17, wherein the recess is formed in the first engagement surface of the first slide member and the locking projection extends from the second engagement surface of the second slide member.

19. The baler of claim 11, further comprising at least one spring bearing on at least one of the first slide member and the second slide member to hold the first slide member and the second slide member together.

20. The baler of claim 19, wherein the at least one spring comprises a first spring bearing on the first slide member and a second spring bearing on the second slide member.

* * * * *